US008503932B2

(12) United States Patent
Demuynck et al.

(10) Patent No.: US 8,503,932 B2
(45) Date of Patent: Aug. 6, 2013

(54) PORTABLE COMMUNICATION DEVICE AND REMOTE MOTION INPUT DEVICE

(75) Inventors: Randolph C. Demuynck, Wake Forest, NC (US); Kevin M. Shay, Cary, NC (US)

(73) Assignees: Sony Mobile Comminications AB, Lund (SE); Sony Corporation, Tokyo (JP)

( * ) Notice: Subject to any disclaimer, the term of this patent is extended or adjusted under 35 U.S.C. 154(b) by 890 days.

(21) Appl. No.: 12/271,549

(22) Filed: Nov. 14, 2008

(65) Prior Publication Data

US 2010/0124949 A1 May 20, 2010

(51) Int. Cl.
*H04B 7/00* (2006.01)
(52) U.S. Cl.
USPC ..... 455/41.2; 455/41.3; 455/66.1; 455/556.1; 455/550.1; 345/156; 345/158; 345/169; 345/672
(58) Field of Classification Search
USPC ............... 455/41.2, 41.3; 345/156, 158, 169, 345/672, 154; 361/679.03
See application file for complete search history.

(56) References Cited

U.S. PATENT DOCUMENTS

| 6,151,208 | A  | * | 11/2000 | Bartlett | 361/679.03 |
|---|---|---|---|---|---|
| 6,573,883 | B1 | * | 6/2003 | Bartlett | 345/156 |
| 6,614,422 | B1 | * | 9/2003 | Rafii et al. | 345/168 |
| 7,109,970 | B1 | * | 9/2006 | Miller | 345/156 |
| 7,148,879 | B2 | * | 12/2006 | Amento et al. | 345/158 |
| 7,173,604 | B2 | * | 2/2007 | Marvit et al. | 345/156 |
| 7,714,880 | B2 | * | 5/2010 | Johnson | 345/672 |
| 2003/0011573 | A1 | * | 1/2003 | Villet et al. | 345/169 |
| 2004/0046744 | A1 | * | 3/2004 | Rafii et al. | 345/168 |
| 2005/0212911 | A1 | * | 9/2005 | Marvit et al. | 348/154 |
| 2006/0103623 | A1 | * | 5/2006 | Davis | 345/156 |
| 2006/0192763 | A1 | * | 8/2006 | Ziemkowski | 345/168 |
| 2006/0234784 | A1 | * | 10/2006 | Reinhorn | 455/575.1 |
| 2007/0063979 | A1 | * | 3/2007 | Tran | 345/169 |
| 2009/0096746 | A1 | * | 4/2009 | Kruse et al. | 345/156 |
| 2011/0130159 | A1 | * | 6/2011 | Chen et al. | 455/466 |
| 2011/0151936 | A1 | * | 6/2011 | Jang et al. | 455/566 |

FOREIGN PATENT DOCUMENTS

| EP | 1 396 981 | 3/2004 |
|---|---|---|
| GB | 2 428 802 | 2/2007 |
| WO | 2006/068357 | 6/2006 |

OTHER PUBLICATIONS

International Search Report and Written Opinion for International Application No. PCT/US2009/043395 dated Jul. 20, 2009.

* cited by examiner

*Primary Examiner* — April G Gonzales
(74) *Attorney, Agent, or Firm* — Renner, Otto, Boisselle & Sklar

(57) ABSTRACT

A portable communication device is configured to communicate with an associated remote motion input device. The remote motion input device is configured to be attached to a portion of a user and configured to detect orientation and motion data. The portable communication device includes a remote motion input device controller that receives motion data from the remote motion input device via a local wireless link and converts the motion data into input commands such that the portable communication device carries out functions according to the input commands.

14 Claims, 6 Drawing Sheets

PORTABLE COMMUNICATION DEVICE AND REMOTE MOTION INPUT DEVICE

TECHNICAL FIELD OF THE INVENTION

The present invention relates generally to portable communication devices, and more particularly, to a portable communication device and a remote motion input device.

DESCRIPTION OF RELATED ART

In recent years, portable communication devices, such as mobile phones, personal digital assistants, mobile terminals, etc., continue to grow in popularity. As the popularity of portable communication devices continues to grow, the applications for and features of portable communication devices continue to expand. Portable communication devices are appealing to users because of their capability to serve as powerful communication, data service and entertainment tools.

Many mobile phones include traditional input devices, such as alphanumeric keypads (e.g., QWERTY keypads) coupled with navigational and special function keys. In addition, touch-sensitive input devices, such as touch screens and touch keypads, have become popular. These devices allow for user input by touching the screen or other touch-sensitive area with a finger or stylus. Touch-sensitive keypads are useful for many applications in the mobile phone environment. Some benefits associated with touch-sensitive keypads include being thinner and easier to clean than mechanical buttons, allowing for easier sealing against water and environmental dirt, and providing reconfigurable button areas, e.g., soft keys, and permitting adaptable keypads.

SUMMARY

To enhance functionality and versatility, a portable communication device is provided with an alternative to traditional input devices in the form of a remote motion input device. The remote motion input device is configured to be worn by a user and includes orientation and motion sensors to determine user motion indicative of user input. The portable communication device is configured to receive motion signals via a wireless link and to covert the motion signals into input commands. The provision of a portable communication device having a remote motion input device and gesture recognition control enables mouse-like input without the inconvenience of mouse hardware.

One aspect of the disclosed technology relates to a portable communication device that includes a local wireless interface configured to receive motion signals indicative of motion of an associated remote motion input device from the remote motion input device; and a remote motion input device controller configured to receive the motion signals from the remote motion input device and to convert the received motion signals into input commands, wherein the portable communication device is configured to carry out a function according to the input commands.

According to one feature, at least one received motion signal is converted into a text entry command.

According to one feature, at least one received motion signal is converted into a command to select a graphical user interface object.

According to one feature, at least one received motion signal is converted into a command to launch an application.

According to one feature, the portable communication device also includes a remote motion input device in wireless communication with the portable communication device via a local wireless link.

According to one feature, the remote motion input device includes a housing, an orientation sensor disposed within the housing; a motion sensor disposed within the housing; a controller operatively coupled to the orientation sensor and to the motion sensor; and a local wireless interface coupled to the controller and configured to transmit orientation sensor data and motion sensor data to the portable communication device.

According to one feature, the orientation sensor comprises a gyroscope.

According to one feature, the orientation sensor comprises a pair of gyroscopes mounted with their respective axles orthogonal to one another.

According to one feature, the motion sensor comprises an accelerometer.

According to one feature, the motion sensor comprises a three-axis accelerometer.

According to one feature, the local wireless interface comprises a Bluetooth interface.

According to one feature, the housing is configured to attach to or be worn by an associated user of the portable communication device.

According to one feature, the housing is configured as a wristwatch.

According to one feature, the portable communication device also includes a projector configured to project a portable communication device graphical user interface on a remote object.

According to one feature, the projector is configured to project a virtual keypad on the remote object.

According to one feature, the portable communication device and the remote motion input device cooperate to provide text input in response to a user selecting keys on the virtual keypad.

According to one feature, the portable communication device is a mobile telephone.

Another aspect of the disclosed technology relates to a remote input device that provides input to a portable communication device. The remote input device includes a housing; an orientation sensor disposed within the housing; a motion sensor disposed within the housing; a controller operatively coupled to the orientation sensor and to the motion sensor; and a local wireless interface coupled to the controller and configured to transmit orientation sensor data and motion sensor data to an associated portable communication device.

According to one feature, the orientation sensor comprises a gyroscope and the motion sensor comprises a multi-axis accelerometer.

According to one feature, the local wireless interface comprises a Bluetooth interface.

According to one feature, the remote input device is configured as a wristwatch.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended thereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

Figure 1:
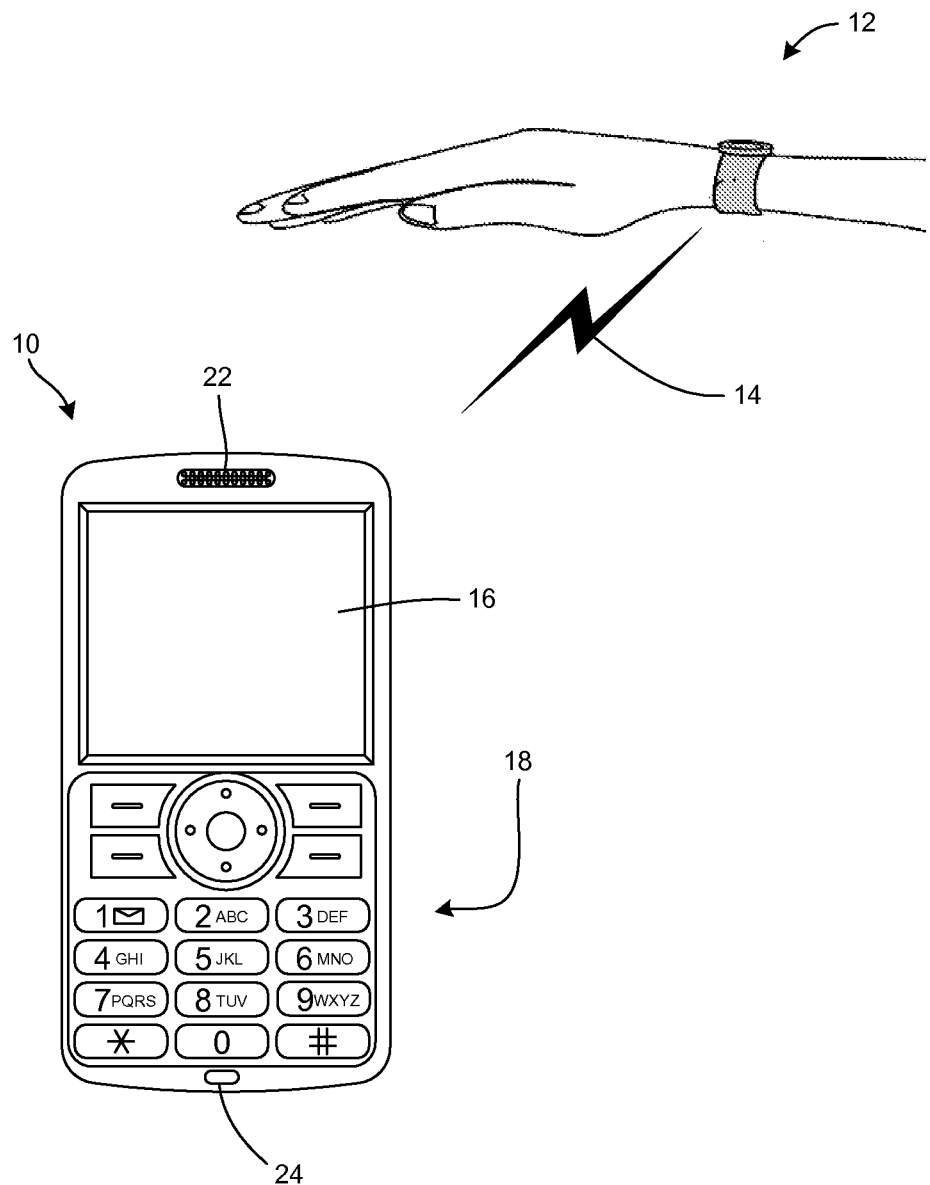
FIG. 1 is a diagrammatic illustration of a mobile phone as an exemplary portable communication device including a remote motion input device.

In the detailed description that follows, like components have been given the same reference numerals regardless of whether they are shown in different embodiments of the present invention. To illustrate the present invention in a clear and concise manner, the drawings may not necessarily be to scale and certain features may be shown in somewhat schematic form.

As referred to herein, the term "portable communication device" includes portable radio communication equipment. The term "portable radio communication equipment", which herein after is referred to as a mobile phone, a mobile device, a mobile radio terminal or a mobile terminal, includes all electronic equipment, including, but not limited to, mobile telephones, pagers, communicators, i.e., electronic organizers, smartphones, personal digital assistants (PDAs), or the like. While the disclosed technology is being discussed with respect to portable communication devices, it is to be appreciated that the invention is not intended to be limited to portable communication devices, and can be applied to any type of handheld mobile electronic equipment configured to interface with a remote motion input device.

In the context of the illustrated embodiments, the portable communication device is primarily referred to as a mobile telephone or a mobile phone. The description and illustrations of the mobile telephone, however, are intended to serve as a non-limiting exemplary environment for the inventive concepts described herein, and it will be appreciated that the invention is not intended to be limited to a mobile telephone, but rather can be any type of electronic equipment.

While features and functionality of portable communication devices, (e.g., mobile phones) continue to increase, manufacturers and designers of portable communication devices frequently seek to reduce the overall cost and dimensions of portable communication devices, while maintaining attractive style characteristics and innovative features.

As the number of mobile phone features increases, graphical user interfaces often become more complicated and require additional display area on the mobile phone display. Typically, display area is at a premium. Also, many portable communication devices include full QWERTY keypads, especially in devices used for messaging applications. This input interface also requires a greater amount of space.

In an effort to enhance the user's experience, the disclosed technology details a method and apparatus for replacing traditional input devices commonly used for operating a mobile phone with a remote motion input device. The remote motion input device is configured to detect user's motion indicative of desired user input and wirelessly transmit motion signals to the mobile phone. The mobile phone is configured to receive the wirelessly transmitted motion signals and convert the signals into input command signals for various desired functions, such as scrolling, zooming, navigation and text or character entry.

The provision of a portable communication device having a remote motion input device and gesture recognition control enables mouse-like input without the inconvenience of mouse hardware. As is discussed more fully below, the provision of a mobile phone with a remote motion input device allows for an enhanced user experience in which the mode of user input moves away from viewing of the display and/or phone keypad.

Referring initially to FIG. 1, an exemplary embodiment of a portable communication device 10 (e.g., a mobile phone, mobile terminal or the like) is shown. The mobile phone 10 is shown as having a "block" or "candy bar" type of housing, but it will be appreciated that other form factors or housing types, such as, for example, a clamshell or slide-type housing, may be utilized without departing from the scope of the present invention.

The portable communication device is configured to receive user input from or otherwise communicate with a remote motion input device 12. As is discussed more fully below, the portable communication device 10 and remote motion input device 12 are configured to communicate via a local wireless link (represented by reference numeral 14). In the illustrated embodiment, the remote motion input device 12 is configured as a wrist watch with working time keeping components, but it will be appreciated that other form factors or housing types, such as, for example, a bracelet, a wristband or arm band, a ring or other device that may be worn by the user and move with motion of a corresponding part of the user, may be employed without departing from the scope of the present invention. It will be appreciated that a remote motion input device 12 may be worn on a portion of the user's body other than the arm or hand although the arm and/or hand are capable of moving in manners that are readily convertible into distinguishable input command signals.

As is discussed more fully below, the portable communication device 10 is configured to include a remote motion input device controller that operates to receive motion signals from the remote motion input device 12 and convert the motion signals into input commands for controlling operations of and functions carried out by the portable communication device.

The mobile phone may include a display 16 (e.g., a standard or dedicated LCD display, a touch screen or the like). The display 16 may be configured to display information to a user, such as, operating state, time, telephone numbers, contact information, graphical user interface menus, and the like. The user also can view and utilize various functions related to the various operating states of the mobile phone on the display 16. The display 16 also may be used to visually display content received by the mobile phone 10 and/or retrieve from a memory of a mobile phone 10. For example, the user can watch movies, play video games, and browse the internet, etc., on the screen. Such audio/video materials may be stored on memory within the phone or accessed from remote servers. As is described more fully below, the mobile phone may be equipped with a projector or otherwise coupled to a projector such that information normally shown on the display may also be projected onto a remote object, such as a wall or other surface suitable for projection.

A keypad 18 provides for a variety of user input operations in addition to those that may be provided by the remote motion input device 12. For example, the keypad 18 may include alphanumeric keys for allowing entry of alphanumeric information such as telephone numbers, phone lists, contact information, notes, texts, etc. In addition, the keypad 18 may include special function keys, such as a "call send" key for initiating or answering a key and a "call end" key for hanging up a call. Special function keys also may include menu navigation keys, for example, for navigating through a menu on a display to select different telephone functions, profiles, settings, etc., as is conventional. Other navigational keys or controls may include directional keys (e.g., up, down, left, and right) to highlight different links, or icons, or to navigate texts or other documents. Other keys associated with the mobile phone may include a volume key, an audio mute key, an on/off power key, a web browser launch key, a camera key and the like. The navigational keys may be embodied as "hard keys" or "soft keys" implemented on a touch-sensitive input device.

As is described more fully below, the mobile phone is configured to wirelessly receive motion signals indicative of user input and to convert the received motion signals into input commands.

Figure 2:
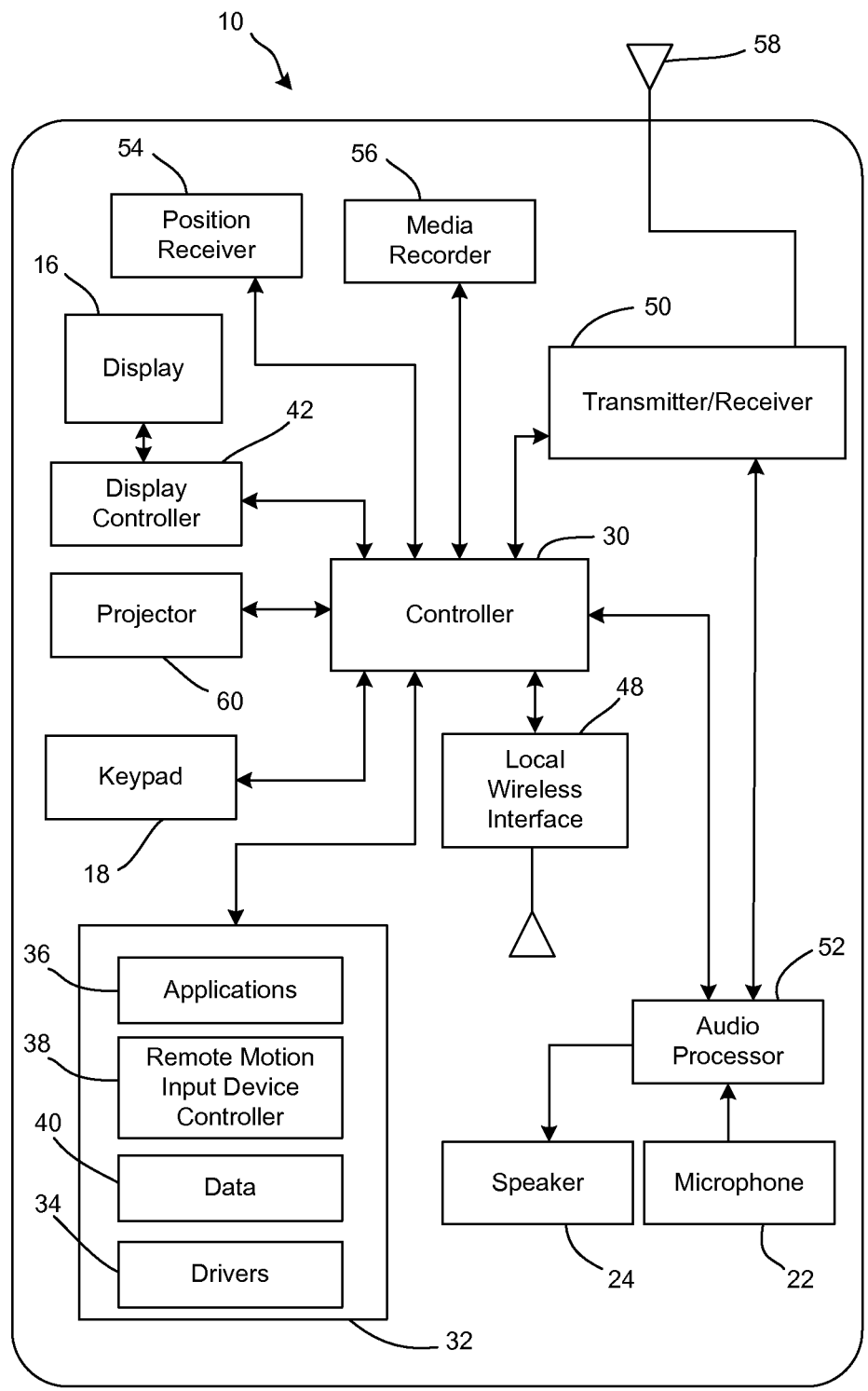
FIG. 2 is a block diagram of the mobile phone of FIG. 1.

FIG. 2 represents a functional block diagram of a portable communication device 10. The portable communication device 10 includes a controller 30 that controls the overall operation of the portable communication device. The controller 30 may include any commercially available or custom microprocessor or microcontroller. Memory 32 is operatively connected to the controller 30 for storing control programs and data used by the portable communication device. The memory 32 is representative of the overall hierarchy of memory devices containing software and data used to implement the functionality of the portable communication device in accordance with one or more aspects described herein. The memory 32 may include, for example, RAM or other volatile solid-state memory, flash or other non-volatile solid-state memory, a magnetic storage medium such as a hard disk drive, a removable storage media, or other suitable storage means. In addition to handling voice communications, the portable communication device 10 may be configured to transmit, receive and process data, such as web data communicated to and from a web server, text messages (also known as short message service or SMS), electronic mail messages, multimedia messages (also known as MMS), image files, video files, audio files, ring tones, streaming audio, streaming video, data feeds (e.g., podcasts) and so forth.

In the illustrated embodiment, memory 32 stores drivers 34 (e.g., I/O device drivers), application programs 36, a remote motion input device controller 38, and application program data 40. The I/O device drivers include software routines that are accessed through the controller 30 (or by an operating system (not shown) stored in memory 32) by the application programs and remote motion input device controller 38 to communicate with devices such as the remote motion input device 12, as well as other input/output ports. In one embodiment where the mobile phone includes a dedicated display 16, the display 16 may be operatively coupled to and controlled by a display controller 42 (e.g., a suitable microcontroller or microprocessor).

The application programs 36, as well as the remote motion input device controller 38, comprise programs that implement various features of the portable communication device, such as voice calls, e-mail, Internet access, multimedia messaging, contact manager and the like. As is described more fully below, the remote motion input device controller 38 comprises a program, logic routine, code or circuitry that cooperates with the remote motion input device to receive motion signals from the remote motion input device and convert the motion signals into input command signals to control the portable communication device in accordance with signals received from the remote motion input device (e.g., to facilitate character entry and/or navigation by way the user manipulating the remote motion input device).

In one embodiment, the remote motion input device 12 is operatively coupled to the remote input device controller 38 via a local wireless interface 46 (e.g., a Bluetooth adapter) and configured to control the portable communication device by converting motion signals from the remote motion input device into command signals for controlling portable communication device functions (e.g., to facilitate character selection, navigation, application launching and other functionality).

It will be appreciated that the portable communication device also may include one or more other local wireless interfaces, such as an infrared transceiver and/or an RF adapter, e.g., a Bluetooth adapter, WLAN adapter, Ultra-Wideband (UWB) adapter and the like, for establishing communication with an accessory, a hands free adapter, e.g., a headset that may audibly output sound corresponding to audio data transferred from the portable communication device 10 to the adapter, another mobile radio terminal, a computer, or any other electronic device. Also, the wireless interface may be representative of an interface suitable for communication within a cellular network or other wireless wide-area network (WWAN).

With continued reference to FIG. 2, the controller 30 interfaces with the aforementioned remote motion input device 12 (and any other user interface device(s)), a transmitter/receiver 50 (often referred to as a transceiver), audio processing circuitry, such as an audio processor 52, and a position determination element or position receiver 54, such as a global positioning system (GPS) receiver. The portable communication device 10 may include a media recorder 56 (e.g., a still camera, a video camera, an audio recorder or the like) that captures digital pictures, audio and/or video. Image, audio and/or video files corresponding to the pictures, songs and/or video may be stored in memory 32.

An antenna 58 is coupled to the transmitter/receiver 50 such that the transmitter/receiver 50 transmits and receives signals via antenna 58, as is conventional. The portable communication device includes an audio processor 52 for processing the audio signals transmitted by and received from the transmitter/receiver. Coupled to the audio processor 52 are the speaker 22 and microphone 24, which enable a user to listen and speak via the portable communication device. Audio data may be passed to the audio processor 52 for playback to the user. The audio data may include, for example, audio data from an audio file stored in the memory 32 and retrieved by the controller 30. The audio processor 52 may include any appropriate buffers, decoders, amplifiers and the like.

In one embodiment, the portable communication device is equipped with a projector 60 that may be configured to project some or all of a graphical user interface normally displayed on the device display (or other user interface objects) onto a remote object, such as a wall or screen. As is described more fully below, the portable communication device and remote motion input device may be configured to cooperate to facilitate text entry via the remote motion input device when a user selects keys represented on a virtual keypad projected by the portable communication device. Alternatively, the portable communication device may be configured to communicate with a separate projection device via a suitable communication link (e.g., a local wireless communication link).

Figure 3:
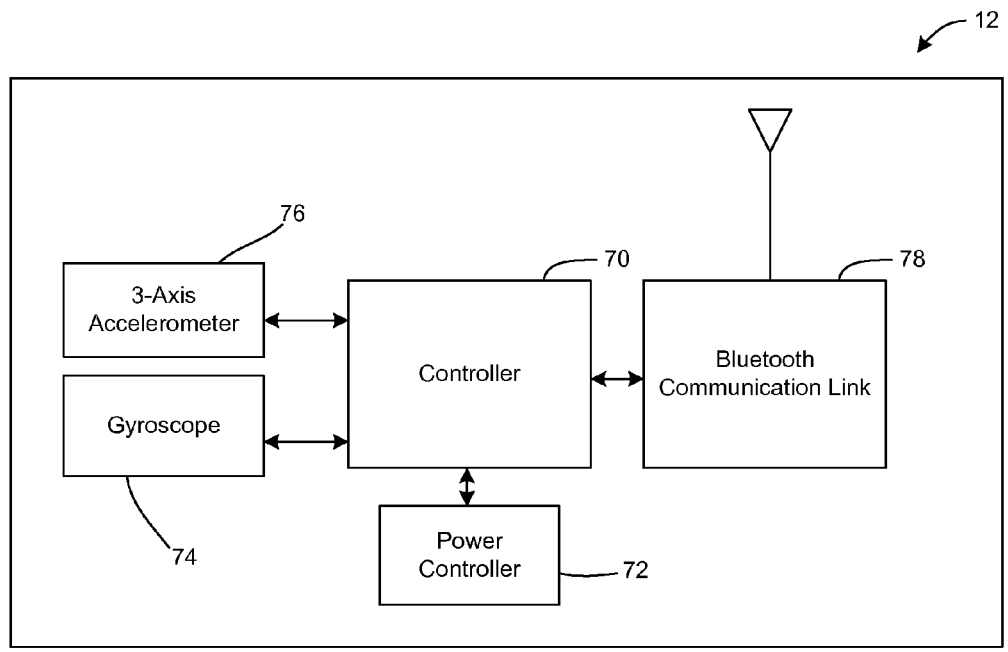
FIG. 3 is a block diagram of the remote motion input device of FIG. 1.

FIG. 3 represents a functional block diagram of an exemplary remote motion input device 12. In the illustrated embodiment, the remote motion input device is configured as a watch to be worn on a user's wrist. However, as noted above, it will be appreciated that other device configurations may be employed without departing from the scope of the present invention. For example, the remote motion input device 12 may be configured as a bracelet, a wrist or arm band, a ring or other device that can be worn by the user and move with and sense motion by the user. Further, it will be appreciated that the remote motion input device may be worn on a portion of the user other than the arm or hand provided that the motion is readily convertible into distinguishable input command signals.

The remote motion input device 12 includes a central controller 70 that controls the overall operation of the remote motion input device. The controller 70 may include any commercially available or custom microprocessor or microcontroller. In the illustrated embodiment, the controller is coupled to a separate power controller 72, although it will be appreciated that other configurations may be employed. The remote motion input device 12 further includes appropriate orientation sensors, for example, a gyroscope 74, a tilt sensor, an inclinometer or other appropriate orientation sensor, and appropriate motions sensors, for example, an accelerometer 76 (e.g., a three-axis accelerometer). Of course, other suitable motion sensors and orientation sensors may be employed without departing from the scope of the present invention.

The gyroscope 74 and accelerometer 76 serve to detect relative motions and/or orientation of the remote motion input device as it moves along with a portion or portions of the user's body to which it is connected. A variety of digital and/or analog gyroscope and accelerometer devices may be employed such that a continuous stream or sampling of motion data is output from the gyroscope and/or the accelerometer. The remote motion input device is configured with a suitable local wireless communications interface 78, such as a Bluetooth link that is configured to wirelessly transmit the detected motion signals to the mobile phone for the conversion of the motion signals into input command signals.

It will be appreciated that the accelerometer (e.g., a multi-axis accelerometer) and gyroscope orientation sensor will serve to gather remote user input data (also referred to as gesture data). In this regard, the mobile phone may be configured to recognize a plurality of predetermined gesture motions as detected by the accelerometer and gyroscope.

Figure 4:
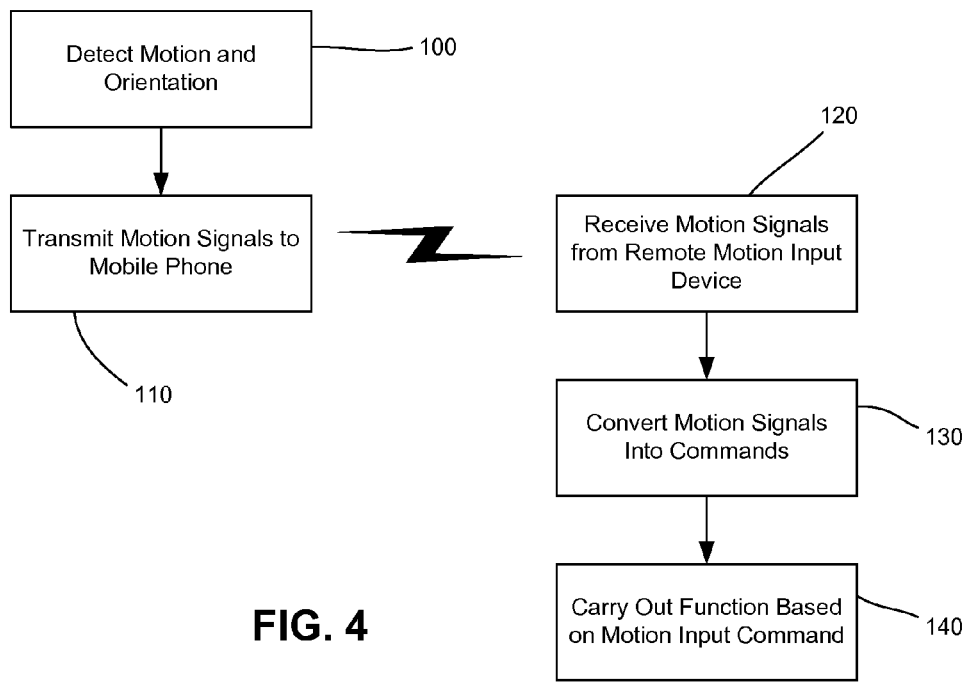
FIG. 4 is a flow chart or functional block diagram depicting a method of providing input to a portable communication device via a remote motion input device.

Turning now to FIG. 4, a method of remote motion control of a portable communication device is depicted. While for purposes of simplicity of explanation, the flow chart or functional diagram in FIG. 4 includes a series of steps or functional blocks that represent one or more aspects of the relevant operation of the portable communication device 10 and/or the remote motion input device 12, it is to be understood and appreciated that aspects of the invention described herein are not limited to the order of steps or functional blocks, as some steps or functional blocks may, in accordance with aspects of the present invention occur in different orders and/or concurrently with other steps or functional blocks from that shown or described herein. Moreover, not all illustrated steps or functional blocks of aspects of relevant operation may be required to implement a methodology in accordance with an aspect of the invention. Furthermore, additional steps or functional blocks representative of aspects of relevant operation may be added without departing from the scope of the present invention.

At functional block 100, the motion sensor and the orientation sensor (e.g., the accelerometer and gyroscope) cooperate to detect motion and/or gesturing of the user by way of the remote motion input device. For example, the accelerometer is configured to capture acceleration data, preferably along three axes to indicate relative motion of the device while the gyroscope is configured to capture data indicative of the relative orientation of the remote motion input device, such as inclination or tilting of the device. At functional block 110, the remote motion input device transmits motion data to an associated mobile phone, for example, by way of a suitable local wireless link, such as a Bluetooth link.

At functional block 120, the mobile phone receives motion signals from the remote motion input device, for example, regular sampling or steady stream of signals or data indicative of the motion and/or orientation of the remote motion input device. At functional block 130, the motion signals are converted into input command signals or gesture input command signals by suitable processing circuitry. For example, the remote motion input device controller may be configured or otherwise programmed to recognize gestures or groups of gestures as being indicative of one or more desired user inputs. Examples of types of recognizable gestures are provided below. At functional block 140, the mobile phone carries out functions and/or entry of input based on the received motion input command signals. Exemplary functions or commands include entry of text or other characters, navigation through menus or other interface objects and selection of user interface objects.

Figure 5:
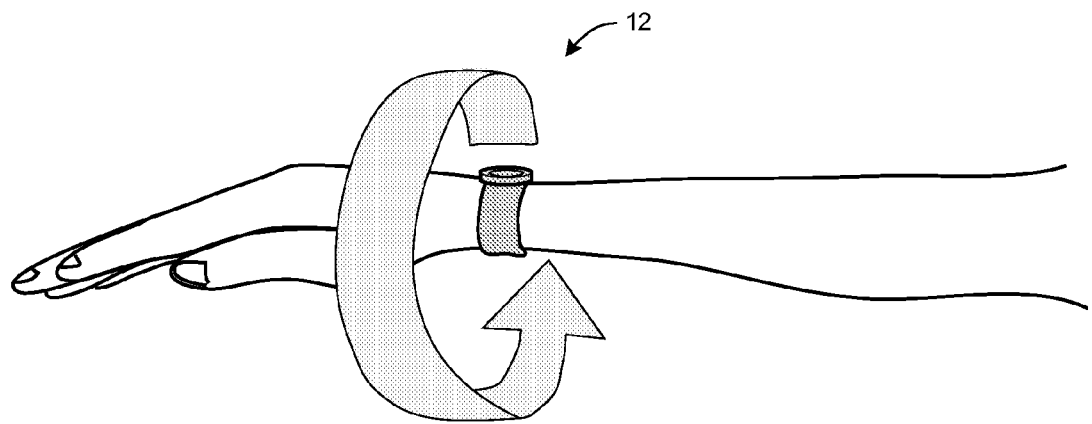
FIG. 5 is a diagrammatic illustration of one exemplary gesture that is detectable by the remote motion input device.

Turning now to FIGS. 5-8, it will be appreciated that the mobile phone may be configured to detect a number of predetermined gestures or motions of the remote motion input device and to convert those uniquely detectable gestures or motions into input command signals for providing data input and/or navigational input to the mobile phone. For example, as shown in FIG. 5, the mobile phone may be configured to recognize motion of the remote motion input device corresponding to wrist rotation, such as when the user would rotate his or her wrist in a clockwise or counterclockwise manner while wearing a remote motion input device configured as a wristwatch.

Figure 6:
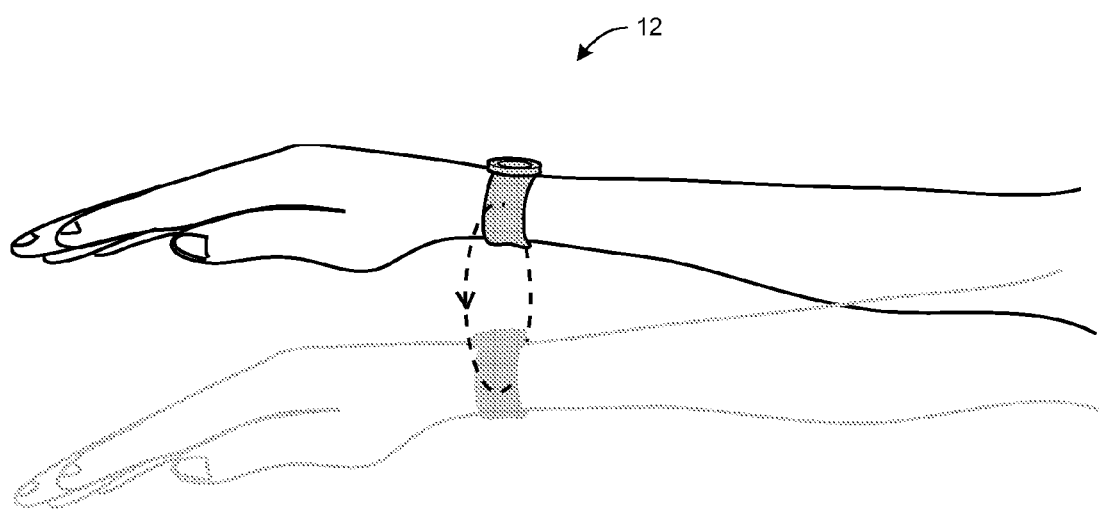
FIG. 6 is a diagrammatic illustration of another exemplary gesture that is detectable by the remote motion input device.
Figure 7:
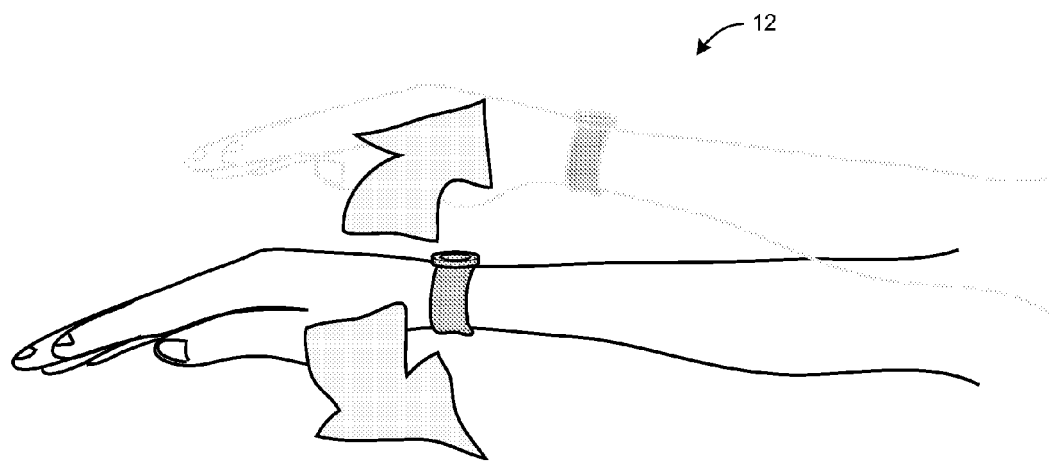
FIG. 7 is a diagrammatic illustration of another exemplary gesture that is detectable by the remote motion input device.
Figure 8:
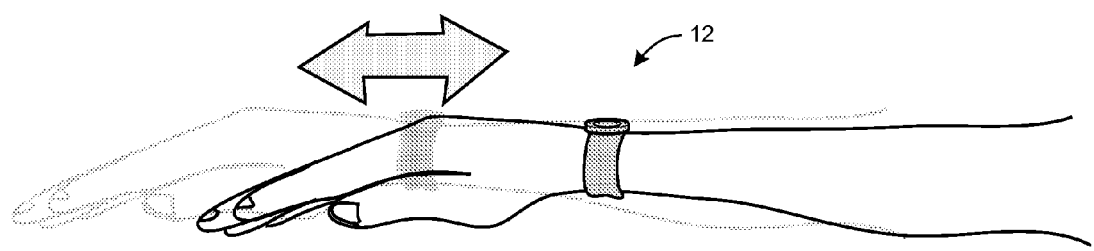
FIG. 8 is a diagrammatic illustration of another exemplary gesture that is detectable by the remote motion input device.

FIG. 6 shows yet another uniquely detectable gesture consisting of a circular movement of the user's wrist along a circular path about the elbow pivot point. FIG. 7 shows another exemplary uniquely detectable gesture consisting of a waving motion where the user makes a waving movement of the wrist within a plane about the user's elbow pivot point with the user's fingers sweeping along an arc. FIG. 8 shows yet another exemplary uniquely detectable gesture consisting of a poking motion movement of the wrist along a linear path extending along the elbow to the hand access as shown in FIG. 8.

It will be appreciated that gestures can be combined by the user to create patterns that the remote motion input device controller software detects and translates into input command actions such as selecting user interface objects, moving the objects and releasing the objects. Gesture patterns also can be used to enable and disable the user input via the remote motion input device sensors. It will be appreciated that when combined with the mobile phone, the above-described gesture motion input technology enables a mouse-like input without the inconvenience of mouse hardware. By mapping wave gestures to movement of the screen-displayed mouse pointer location and mapping poke gestures to selection of user interface objects under the current mouse pointer location, navigation through the complete mobile user interface paradigm is possible. As the user makes gestures with the watch-based arm, mouse location feedback may be provided on the mobile screen. Wrist rotation gestures may be used to enable and disable the conversion of gestures into mouse behavior releasing the watch-based arm to do other things.

Figure 9:
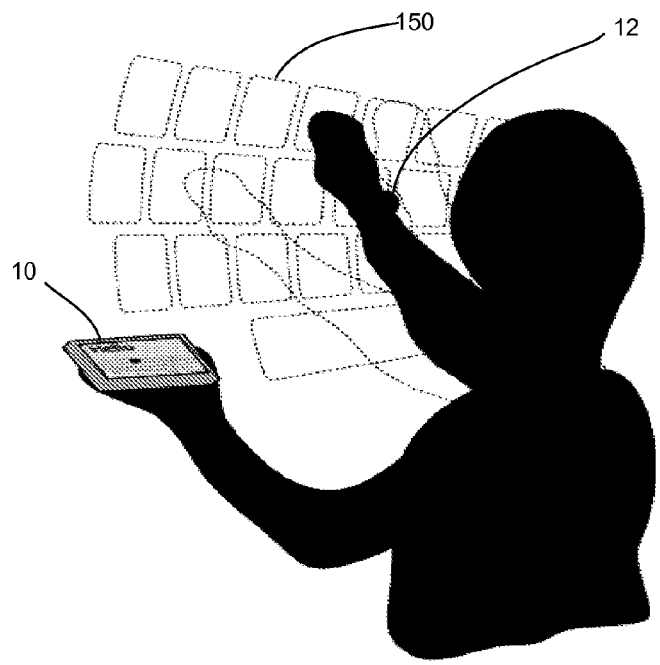
FIG. 9 is a diagrammatic illustration of one exemplary mode of usage of the portable communication device.
Figure 10:
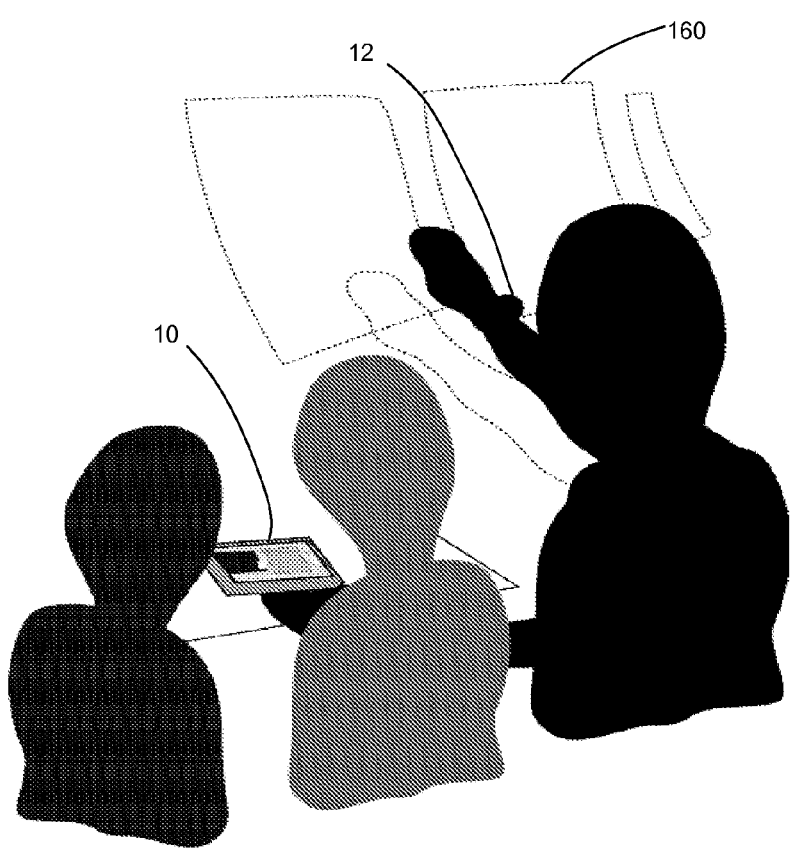
FIG. 10 is a diagrammatic illustration of another exemplary mode of usage of the portable communication device.

Turning now to FIGS. 9 and 10, further applications of the gesture controlled user interface are provided. For example, FIG. 9 shows an embodiment in which the mobile phone, or a device operatively coupled to a mobile phone, may be configured to project or otherwise display a virtual keypad 150 or other virtual user interface on a remote object such as a wall or screen. In this exemplary embodiment, the remote motion input device 12 may send signals to the mobile phone 10 indicative of the user's desire to enter text input into the device. As such, the application of gesture motion input technology may enable a user to enter a text message by simply touching portions of a virtual keypad displayed on a wall or screen. Alternatively, the mobile phone may include various user interface templates (e.g., an interface template indicative of a virtual keypad) in cases where projection equipment is not readily available.

FIG. 10 shows yet another application of gesture motion input technology in which a user is able to share mobile content with others. For example, through suitable projection technology, the graphical user interface 160 may be projected on a screen or wall and the user wearing the remote motion input device may be able to enter navigational or mouse-like commands by way of moving the remote motion input device while contacting the virtual graphical user interface. Other applications will be appreciated as coming within the scope of the present invention. For example, multiple remote motion input devices may be employed at one time, such as when a user might wear one remote motion input device on each hand or writs, with one of the remote motion input devices providing coarse navigation, and the other remote motion input device providing finer navigation or selection.

The benefits of applying this input technology are many. For example, it enables a mouse input paradigm in an environment where compact design restricts hardware input device space and size. Use of the mouse input paradigm allows more selectable user interface objects on a screen when compared to a touch input paradigm; thus it enables a richer user interface design. And, because user input is physically decoupled from the device, sharing mobile content with others is more easily achieved. The disclosed technology provides an alternative to traditional input devices for operating a mobile device in which a user may move away from viewing screen and from using phone keypad for data entry/navigation.

Other applications may be found in connection with gaming applications, or medical applications for handicapped people by which text entry or other graphical user interface navigation may be accomplished by way of a virtual keypad or virtual graphical user interface.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A portable communication device comprising:
a local wireless interface configured to receive motion signals indicative of motion of an associated remote motion input device from the remote motion input device, the portable communication device being in wireless communication with the remote motion input device via a local wireless link to receive the motion signals;
a remote motion input device controller configured to receive the motion signals from the remote motion input device and to convert the received motion signals into input commands, wherein the portable communication device is configured to carry out a function according to the input commands; and
a projector configured to project a virtual keypad on a remote object;
wherein the portable communication device and the remote motion input device cooperate to provide text input in response to a user selecting keys on the virtual keypad; and
wherein the motion signals are indicative of a spatial location of the remote motion input device relative to the virtual keypad.

2. The portable communication device of claim 1, wherein at least one received motion signal is converted into a text entry command.

3. The portable communication device of claim 1, wherein at least one received motion signal is converted into a command to select a graphical user interface object.

4. The portable communication device of claim 1, wherein at least one received motion signal is converted into a command to launch an application.

5. The portable communication device of claim 1 in combination with the remote motion input device, wherein the remote motion input device comprises:
a housing;
an orientation sensor disposed within the housing;
a motion sensor disposed within the housing;
a controller operatively coupled to the orientation sensor and to the motion sensor; and
a local wireless interface coupled to the controller and configured to transmit orientation sensor data and motion sensor data to the portable communication device.

6. The combination of claim 5, wherein the orientation sensor comprises a gyroscope.

7. The combination of claim 6, wherein the motion sensor comprises an accelerometer.

8. The combination of claim 7, wherein the motion sensor comprises a three-axis accelerometer.

9. The combination of claim 5, wherein the local wireless interface comprises a Bluetooth interface.

10. The combination of claim 5, wherein the housing is configured to attach to or be worn by an associated user of the portable communication device.

11. The combination of claim 10, wherein the housing is configured as a wristwatch.

12. The combination of claim 5, further comprising a projector configured to project a portable communication device graphical user interface on a remote object.

13. The portable communication device of claim 1, wherein the portable communication device is a mobile telephone.

14. The combination of claim 6, wherein the orientation sensor comprises a pair of gyroscopes mounted with their respective axes orthogonal to one another.

* * * * *